US010155224B2

(12) United States Patent
Shan

(10) Patent No.: US 10,155,224 B2
(45) Date of Patent: Dec. 18, 2018

(54) MATING STRUCTURE OF LIQUID EXTRACTION PIECE AND TEST TUBE ASSEMBLY

(71) Applicant: WUXI KAISHUN MEDICAL DEVICE MANUFACTURING CO., LTD., Wuxi, Jiangsu (CN)

(72) Inventor: Xijie Shan, Wuxi (CN)

(73) Assignee: WUXI KAISHUN MEDICAL DEVICE MANUFACTURING CO., LTD., Wuxi, Jiangsu (CN)

( * ) Notice: Subject to any disclaimer, the term of this patent is extended or adjusted under 35 U.S.C. 154(b) by 101 days.

(21) Appl. No.: 15/518,617

(22) PCT Filed: Mar. 30, 2016

(86) PCT No.: PCT/CN2016/077800
§ 371 (c)(1),
(2) Date: Apr. 12, 2017

(87) PCT Pub. No.: WO2016/155617
PCT Pub. Date: Oct. 6, 2016

(65) Prior Publication Data
US 2017/0239652 A1 Aug. 24, 2017

(30) Foreign Application Priority Data
Apr. 2, 2015 (CN) ..................... 2015 2 0197428 U
Mar. 24, 2016 (CN) .......................... 2016 1 0171955

(51) Int. Cl.
*G01N 1/00* (2006.01)
*B01L 3/00* (2006.01)
*B67C 11/00* (2006.01)

(52) U.S. Cl.
CPC .......... *B01L 3/50825* (2013.01); *B67C 11/00* (2013.01); *B01L 2200/026* (2013.01);
(Continued)

(58) Field of Classification Search
CPC ........................................................ G01N 1/00
See application file for complete search history.

(56) References Cited

U.S. PATENT DOCUMENTS 5,202,093 A 4/1993 Cloyd
5,622,183 A 4/1997 Hazard et al.
(Continued)

FOREIGN PATENT DOCUMENTS

CA 2015571 10/1991
CN 102334997 B 11/2013
(Continued)

OTHER PUBLICATIONS

Extended European Search Report dated Nov. 7, 2017 in European Application No. 16771372.6 (9 pages).
(Continued)

*Primary Examiner* — Jyoti Nagpaul
(74) *Attorney, Agent, or Firm* — Nixon & Vanderhye P.C.

(57) ABSTRACT

Disclosed is a mating structure of a liquid extraction piece and a test tube assembly, which comprises the liquid extraction piece (1) and the test tube assembly (4). A test tube plug (2) is arranged at an opening end (32) of a test tube (3). The lower portion of the liquid extraction piece (1) is mated with the test tube assembly (4). The body of the test tube plug (2) is provided with a blocking body (25). The blocking body (25) is provided with a movable portion (253) and a fixed portion (252). The movable portion (253) can move with respect to the fixed portion (252). An axial recess is arranged above an upper surface (251) of the movable portion (253). The lower portion of the liquid extraction piece (1) is mated with the recess. The blocking body (25) is located in a lumen (31) of the test tube (3).

19 Claims, 17 Drawing Sheets

(52) U.S. Cl.
CPC . *B01L 2200/0684* (2013.01); *B01L 2200/141* (2013.01); *B01L 2300/042* (2013.01); *B01L 2300/0832* (2013.01); *B67C 2011/30* (2013.01)

(56) References Cited

U.S. PATENT DOCUMENTS

| | | | |
|---|---|---|---|
| 5,921,419 | A | 7/1999 | Niedospial, Jr. et al. |
| 6,054,099 | A | 4/2000 | Levy |
| 2014/0041758 | A1 | 2/2014 | Fournier et al. |

FOREIGN PATENT DOCUMENTS

| | | | |
|---|---|---|---|
| CN | 103459036 | | 12/2013 |
| CN | 203944399 | | 11/2014 |
| CN | 204173902 | U | 2/2015 |
| WO | WO 9908792 | | 2/1999 |

OTHER PUBLICATIONS

Russian Office Action dated Jan. 30, 2018 in Russian Application No. 2017134925, with partial English translation (7 pages).
International Search Report for PCT/CN2016/077800, dated Jul. 1, 2016, 4 pages.
Written Opinion of the ISA for PCT/CN2016/077800, dated Jul. 1, 2016, 4 pages.

MATING STRUCTURE OF LIQUID EXTRACTION PIECE AND TEST TUBE ASSEMBLY

This application is the U.S. national phase of International Application No. PCT/CN2016/077800 filed 30 Mar. 2016, which designated the U.S. and claims priority to CN Patent Application No. 201520197428.X filed 2 Apr. 2015, and CN Patent Application No. 201610171955.2 filed 24 Mar. 2016, the entire contents of each of which are hereby incorporated by reference.

TECHNICAL FIELD

The present application relates to medical equipment, and particularly to a device for collecting liquid.

TECHNICAL BACKGROUND

In the related art, a combined structure of a liquid collector with a test tube is achieved by connecting a lower part of the liquid collector to the test tube in a manner of inserting.

Firstly, to inject liquid into a test tube, an injecting device is rigidly connected to the test tube and the rigid connection is of poor leakproofness and low stability, thus liquid will likely leak and the injecting device will be likely detached. As a result, cooperation of two persons is required for the injecting, causing complexity and inconvenience in operations.

Secondly, after the opening of the test tube is blocked by a tube plug, it is necessary to remove the tube plug to examine the substance or liquid in the test tube, causing redundant operation steps.

Thirdly, when the injecting device is withdrawn from the opening of the test tube after finishing injecting the liquid into the test tube, the liquid in the test tube is likely taken out from the test tube by the injecting device, thereby contaminating the outside of the test tube.

Fourthly, it is not possible to control the height of the injected liquid in the test tube when the liquid is being injected into the test tube, and the injecting is stopped only after the test tube is full of the injected liquid. In this case, inserting of a test strip or a testing sucker into the test tube easily causes overflowing of the liquid from the test tube, resulting in contamination.

Therefore, in the art, there is a need for a tube plug, which ensures the stable cooperation between the injecting device and the test tube, prevents liquid leak from the test tube, closes the opening of the test tube while liquid is being injected into the test tube, eliminates the contamination, and enables examination of the liquid in the test tube without removing the tube plug.

SUMMARY

Accordingly, an aspect of the present application is to provide a combined structure of a liquid collector with a test tube assembly, which can control the liquid level of the liquid injected in the test tube, improve the stability of the connection between the injecting device and the test tube during liquid injecting, facilitate the testing by a test stripe, and prevent effectively liquid from overflowing from the test tube when a testing sucker is inserted into the test tube for evenly mixing or sucking the liquid.

An object of the present application is implemented as follows.

A combined structure of a liquid collector with a test tube assembly, includes a liquid collector and a test tube assembly, wherein the test tube assembly includes a test tube and a tube plug placed at an opening end of the test tube, an axial passage is formed in the liquid collector, and a lower part of the liquid collector is connected to the test tube assembly, wherein the tube plug includes barriers, each of which includes a fixed part and a movable part extending from the fixed part toward the inside of the test tube, and the movable part is deflectable relative to the fixed part and includes an upper face, a lower face and a lateral side face connecting the upper and lower faces; wherein an axial recess is formed above the upper face of the movable part, the lower part of the liquid collector fits in the axial recess, and the barriers are positioned in a cavity of the test tube.

Further, a first passage, which is formed above the upper faces of the movable parts of the tube plug, is connected with the recess and is configured to receive the lower part of the liquid collector, and an outer surface of the lower part of the liquid collector is fixed to and matches an inner wall of the first passage. The first passage is also advantageous for the sealing and fixedly connecting between the liquid collector and the test tube assembly. Herein, the first passage may have a shape of column, truncated cone or other shapes. The first passage is used for the fixed connection to the liquid collector, eliminating the releasing of the cooperation between the test tube assembly and the liquid collector, preventing the liquid at the connection between the liquid collector and the test tube assembly from dropping outside of the test tube assembly when the liquid collector is separated from the test tube assembly, and preventing liquid from being carried by the test stripe and dropping outside of the test tube assembly when the test stripe is pulled out of the test tube. In addition, the first passage is used as a guide for the liquid collector being connected to the test tube assembly. Herein, the case where the outer surface of the lower part of the liquid collector matches with the inner wall of the first passage and the lower part of the liquid collector is positioned above the movable parts of the barriers of the tube plug refers to that: the lower part of the liquid collector abuts against the movable parts to deflect the movable parts downwards and outwards, or the lower part of the liquid collector abuts against the movable parts but the movable parts are not deflected, or the lower end face of the lower part of the liquid collector is spaced from the upper faces of the movable parts by a certain distance. Further, it is possible that the outer surface of the lower part of the liquid collector matches with the inner wall of the first passage and the lower part of the liquid collector abuts against the movable parts to deflect the movable parts downwards and outwards.

Further, the lower part of the liquid collector passes through the recess of the tube plug, and a lower opening of the axial passage of the liquid collector is positioned in the cavity of the test tube and is not higher than the lowest point of the lower part of the tube plug. That is, the lower opening of the axial passage of the liquid collector is lower than the lowest point of the lower part of the tube plug or is at the same level as the lowest point of the lower part of the tube plug.

In the scheme described above, the lower part of the liquid collector is inserted in the first passage of the tube plug, and abuts against the upper faces of the movable parts.

It is possible that the outer surface of the lower part of the liquid collector matches with the inner wall of the first passage, and abuts against the upper faces of the movable parts.

It is possible that the outer surface of the lower part of the liquid collector cooperates with the second annular protrusion arranged on the inner wall of the first passage and abuts on the upper faces of the movable parts; or the outer surface of the lower part of the liquid collector matches with both the inner wall of the first passage and the second annular protrusion arranged on the inner wall of the first passage, and abuts on the upper faces of the movable parts.

It is possible that the first annular protrusion on the outer surface of the lower part of the liquid collector matches with the second annular recess arranged on the inner wall of the first passage, and the outer surface of the lower part of the liquid collector matches with the inner wall of the first passage and abuts on the upper faces of the movable parts.

It is possible that the first annular recess on the outer surface of the lower part of the liquid collector cooperates with the second annular protrusion arranged on the inner wall of the first passage, and the outer surface of the lower part of the liquid collector matches with the inner wall of the first passage and abuts on the upper faces of the movable parts.

Further, the lower part of the liquid collector includes a portion A and a portion B, and the connection between the portion A and the portion B shrinks. It is possible that shrinking connection is formed by directing connecting the portion A to the portion B, or the bottom of the portion A shrinks and is connected to the portion B.

The portions A and B may cooperate with the tube plug as follows.

It is possible that an outer surface of the portion A matches the inner wall of the first passage, and an outer surface of the portion B abuts against the upper faces of the movable parts.

It is possible that a first annular recess is arranged on the outer surface of the portion A and cooperates with a second annular protrusion arranged on the inner wall of the first passage, the outer surface of the portion A matches with the inner wall of the first passage, and the outer surface of the portion B abuts against the upper faces of the movable parts.

Alternatively, a first annular protrusion is arranged on the outer surface of the portion A and matches with a second annular recess arranged on the inner wall of the first passage, the outer surface of the portion A matches with the inner wall of the first passage, and the outer surface of the portion B abuts on the upper faces of the movable parts.

Alternatively, a second annular protrusion is arranged on the inner wall of the first passage and matches with the outer surface of the portion A, and the outer surface of the portion B abuts against the upper faces of the movable parts.

In the above scheme, the tube plug may be formed of elastic material such as silicone, rubber, Thermoplastic Polyurethanes (TPU) and Thermoplastic Elastomer (TPE). The axial recess above the upper faces of the moveable parts may be formed in a manner described below.

The axial recess is defined and surrounded by the upper faces of the movable parts, due to the height difference between the bottom of the fixed part and the free end of the movable part. The height difference may result from that the free end of the movable part is lower than the bottom of the fixed part, or result from that the thickness of the movable part decreases in a direction from the fixed end of the movable part to the free end of the movable part, where the thickness of the movable part refers to the distance between the upper face and the lower face of the movable part. The thickness of the movable part may gradually or stepwise (or otherwise) decrease in the direction from the fixed end to the free end of the movable part. The upper face may be a plane, a slope, a curved surface and so on.

Alternatively, the axial recess is defined and surrounded by the upper faces of the movable parts and the first passage above the upper faces of the movable parts. Here the upper face of the movable part may be a plane, a slope, or a curved surface. The first passage is useful for fixedly connecting the liquid connector. When the first passage is present, the inner wall of the first passage is the inner wall of the body of the tube plug.

Further, a second annular protrusion is arranged on the inner wall of the first passage of the tube plug, and is configured for sealing and positioning of the lower part of the liquid collector as well as improving the stability of cooperation with the liquid collector. It is possible that a first annular recess is arranged on the outer surface of the lower part of the liquid collector and cooperates with a second annular protrusion arranged on the inner wall of the first passage. Alternatively, it is possible that the outer surface of the lower part of the liquid collector cooperates with the second annular protrusion arranged on the inner wall of the first passage. It is further possible that a protrusion is arranged on the outer wall of the body of the tube plug and configured for improving positioning and stability of the cooperation with the test tube, where the protrusion may have an annular shape, a lump shape, or a spiral shape.

The tube plug may operate in a closed state and an open state. When the tube plug operates in its closed state, the movable part of the barrier of the tube plug is in its initial state without external force applied thereto. When the tube plug operates in its open state, the movable part of the barrier is deflected lateral outwards under the action of the lower part of the liquid collector, and thus the axial first passage is formed to allow liquid to flow in the test tube or allow a test device to take an sample of the liquid from the test tube. Herein, the tube plug may include 1, 2, 3, 4, or more barriers.

In the case where the tube plug includes at least two barriers, the movable parts of the barriers are independent of each other, and the lateral side faces of the movable parts abut against one another or are separated from each other by a gap.

It is possible that the movable parts of the barriers are independent of each other, and an axial through hole is formed in the tube plug.

It is possible that a cutting line is formed between the movable parts by contacting the lateral side faces of the movable parts.

It is possible that a cutting line is formed between the movable parts by contacting the lateral side faces of the movable parts, and an axial through hole is formed in the tube plug.

It is possible that a cutting line is formed between the lateral side faces of the movable parts and constitutes the axial through hole.

It is possible that the movable parts are movable independently of each other, and the lateral side faces of the movable parts abut against one another.

The gap between the lateral side faces of the adjacent movable parts is more than or equal to 0.06 mm and less than or equal to 1.8 mm, preferably more than or equal to 0.06 mm and less than or equal to 0.3 mm. The gap between the lateral side faces may has an X-shape, a cross shape, a Y-shape, a linear shape, a T-shape or other irregular shape, depending on the number of the movable parts.

If only one barrier is present, a gap is arranged between the movable part of the barrier and the inner wall of the first passage, and the gap is more than or equal to 0.06 mm and less than or equal to 1.8 mm, preferably more than or equal to 0.06 mm and less than or equal to 0.3 mm. The gap forms the axial through hole. It is also possible that the lateral side face of the movable part of the barrier abuts against the inner wall of the first passage, and in this case the upper face of the movable part may be a plane, sloped or curved surface.

After the liquid is injected to the test tube, the residual liquid is poured out from the liquid collector and the liquid collector is separated from the test tube assembly. In this case, the liquid in the test tube contacts with external air at the through hole, that is, a liquid membrane is formed at the opening of the through hole. Herein the liquid membrane refers to a surficial thin layer formed at the surface of the liquid contacting the air, and the surficial thin layer has a molecular density less than that in the liquid, thus the distance between molecules in the surficial thin layer is more than that in the liquid and the interaction between molecules in the surficial thin layer is represented by attraction. By means of the tension character of the liquid surface, the liquid is prevented by the liquid membrane from leaking to the outside from the axial through hole. A decreased area of the through hole contacting the air may result in an improved effect of preventing liquid leak of the liquid membrane. The smallest cross-section of the through hole has an area no less than 2 $mm^2$ and less than 35 $mm^2$, preferably no less than 3 $mm^2$ and less than 18 $mm^2$.

In the scheme described above, the lower opening of the axial passage of the liquid collector is lower than the lowest point of the lower part of the tube plug by at least 1 mm but no more than 20 mm, preferably by at least 2 mm but no more than 12 mm, more preferably by at least 3 mm but no more than 8 mm.

In the case that the lower opening of the axial passage of the liquid collector is lower than the lowest point of the lower part of the tube plug by 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm or 20 mm, when the liquid is flowing into the test tube from the liquid collector, the liquid in the liquid collector will be stopped from flowing into the test tube due to the pressure of the residual air in the test tube after the lower opening of the axial passage of the liquid collector is immersed in the liquid in the test tube, thereby effectively controlling the height of the liquid level in the test tube (due to that the liquid outlet of the liquid guide passage is immersed below the liquid level, or the air outlet of the air exhaust passage is immersed below the liquid level, or both the liquid outlet of the liquid guide passage and the air outlet of the air exhaust passage are immersed below the liquid level), so that the liquid level is remained spaced from the lower end of the tube plug by a certain distance. In this case, after the liquid collector is removed, when an object such as a test stripe or a testing sucker is inserted into the test tube for testing, it is ensured that the inserted object will not cause the liquid level to immediately rise to the lower end of the tube plug, thereby preventing liquid overflow. In addition, for the purpose of evenly mixing the liquid in the test tube by sucking and discharging the liquid with the testing sucker, it is required to initially discharge the air from the testing sucker, in this case, if the liquid level in the test tube is too high or is higher than the lower end of the tube plug, the air discharged from the testing sucker will raise the liquid level and cause liquid overflow when the liquid is sucked and discharged by the testing sucker. Therefore, if the liquid level is controlled lower than the tube plug by a certain distance, it is ensured that the air can be initially discharged from the testing sucker and thus the discharged air is prevented from raising the liquid level to a height higher than the lower end of the tube plug when the testing sucker sucks or discharges liquid or discharges air, thereby preventing liquid overflow from the test tube and ensuring the liquid level required for the testing by the test stripe and testing devices.

Generally, the height of the tube cavity of the test tube is no less than 90 mm and no more than 115 mm. The diameter of the opening of the test tube is more than or equal to 12.5 mm and less than or equal to 16 mm.

In the above scheme, the lower opening of the axial passage of the liquid collector is spaced from the opening of the test tube by no less than 5% of the height of the cavity of the test tube and no more than 35% of the height of the cavity of the test tube, preferably by no less than 10% of the height of the cavity of the test tube and no more than 25% of the height of the cavity of the test tube, and more preferably by no less than 15% of the height of the cavity of the test tube and no more than 22% of the height of the cavity of the test tube.

In the above scheme, the height of the tube plug positioned in the tube cavity of the test tube is no less than 5% of the height of the cavity of the test tube and no more than 20% of the height of the cavity of the test tube, preferably by no less than 8% of the height of the cavity of the test tube and no more than 16% of the height of the cavity of the test tube.

In the above scheme, the passage of the liquid collector includes a liquid guide passage for guiding liquid and/or an air exhaust passage for discharging air. The liquid guide passage includes a liquid inlet and a liquid outlet which is the lower opening of the liquid guide passage; while the air exhaust passage includes an air outlet and an air inlet which is the lower opening of the air exhaust passage.

If the passage of the liquid collector includes a liquid guide passage and an air exhaust passage, a partition part is arranged in the passage of the liquid collector to separate the passage into the liquid guide passage and the air exhaust passage insulated from the liquid guide passage. The partition part may be formed as follows.

The partition part is a connection part connecting the liquid guide passage and the air discharge passage, and the bottom of the connection part is not higher than the liquid outlet and/or the air inlet. It is possible that the bottom of the connection part is lower than both the liquid outlet and the air inlet, or is lower than the air inlet but higher than the liquid outlet, or is aligned with both the liquid outlet and the air inlet.

Alternatively, the partition part is a connection part connecting the liquid guide passage and the air discharge passage, and a first inward recess is arranged on the connection part.

The liquid outlet and the air inlet are positioned at the lower part of the liquid collector. When the lower part of the liquid collector fixedly cooperates with the test tube assembly, the liquid can flow into the tube cavity of the test tube through the liquid guide passage. The smallest cross-section of the liquid guide passage has an area no less than 3 $mm^2$ and no more than 18 $mm^2$, and the smallest cross-section of the air exhaust passage has an area no less than 3 $mm^2$ and no more than 18 $mm^2$. When the liquid collector is fixedly attached to or separated from the test tube assembly, the barrier of the tube plug is deformed. The liquid in the tube cavity is prevented from leaking from the tube cavity both when the liquid collector is fixedly attached to the test tube assembly and the liquid collector is separated from the test tube assembly. Herein the smallest cross-section of the liquid guide passage may be the cross-section of the liquid outlet, and the smallest cross-section of the air discharge passage may be the cross-section of the air inlet.

Preferably, the smallest cross-section of the liquid guide passage has an area more than or equal to 4 $mm^2$ and less than or equal to 12 $mm^2$, while the smallest cross-section of the air discharge passage has an area more than or equal to 4 $mm^2$ and less than or equal to 12 $mm^2$. When the smallest cross-section of the liquid guide passage has an area more than or equal to 4 $mm^2$ and less than or equal to 12 $mm^2$ and the smallest cross-section of the air discharge passage has an area more than or equal to 4 $mm^2$ and less than or equal to 12 $mm^2$, the possibility that the air inlet of the liquid collector is immersed in the liquid and hence the liquid in the liquid collector cannot flow smoothly is reduced, and unsmooth liquid guiding via the liquid collector caused by the intermittent liquid collecting is eliminated. In pouring out the residual liquid in the liquid collector, liquid membranes are formed at the liquid outlet of the liquid guide passage and the air inlet of the air discharge passage, to reduce the possibility that the liquid in the test tube flows out through the liquid outlet or the air inlet. Herein, when the smallest cross-section of the liquid guide passage has an area no more than 10 $mm^2$, it is preferable that the smallest cross-section of the air discharge passage is no less than the smallest cross-section of the liquid guide passage.

Herein the smallest cross-section of the air discharge passage may be the cross-section of the air inlet, and the smallest cross-section of the liquid guide passage may be the cross-section of the liquid outlet.

When the smallest cross-section of the liquid guide passage has an area more than 10 $mm^2$, it is preferable that the smallest cross-section of the air discharge passage has an area no less than 25% of the area of the smallest cross-section of the liquid guide passage, so that the liquid can be guided smoothly and fast by the liquid collector during liquid collecting.

A shielding body may be arranged around the lower opening of the axial passage of the liquid collector and configured to prevent liquid outside of the passage of the liquid collector from spurting onto the outer surface of the test tube. The shielding body has a height no less than 70% of the height of the test tube.

The shielding body, which is positioned around the test tube, may be formed integrally with or separately from the liquid collector. The shielding body may be arranged on the upper part, the middle part or the lower part of the liquid collector, or around the liquid collector, or on the upper part of and round the liquid collector, or on the middle part of and around the liquid collector, or on the lower part of and round the liquid collector. The liquid collector further includes a handle, and a protection side wall is arranged around the handle and configured for preventing liquid from sputtering on the handle. The shielding body includes a shielding wall which surrounds the test tube by an angle no more than 360°. When shielding wall surrounds the test tube by an angle of 360°, a window for scanning and inspecting is arranged on the shielding wall, or the shielding body is made of transparent material instead of provided with the window for scanning and inspecting.

Further, the shielding body includes a first fixed part and a first movable part movably connected to the first fixed part, and the first fixed part may be connected to or formed integrally with the lower part of the liquid collector.

Further, the first movable part is connected to the first movable part in a manner of inserting, and when the axial position of the liquid collector is changed to a certain angle, the first movable part may freely slide in an axial direction relative to the first fixed part under the action of gravity. An axial shrinking groove may be arranged on the side wall of the first movable part.

The shielding body may include a second fixed part and a second movable part rotatable relative to the second fixed part, both the second movable part and the second fixed part have a cross-section of an arc shape, and the second fixed part is fixedly connected to the lower part of the liquid collector. Herein, the second movable part may be rotated relative to the second fixed part, the second movable part is partially overlapped with the second fixed part, and the second movable part and the second fixed part can together surround the test tube at an angle of 360°.

In the scheme above, the portion B has an outer diameter no less than 5.5 mm and no more than 11 mm at a point abutting against the upper faces of the movable parts of the barriers, which is advantageous for the movable part of the barrier, after the liquid collector is separated from the test tube assembly, to return to its initial state where the liquid collector is not attached to the test tube assembly.

Upon completion of liquid collecting, after the residual liquid in the liquid collector is poured out and the liquid collector is separated from the test tube assembly, a liquid level in the test tube is spaced from the lower face of the tube plug by a distance no less than 3.5 mm and no more than 15 mm, preferably no less than 4.5 mm and no more than 12.5 mm.

In the above scheme, the lowest point of the lower part of the tube plug is understood as follows.

1. When the liquid collector is attached to the test tube assembly, the movable part of the barrier is deflected downwards and the lowest point of the movable part represents the lowest point of the lower part of the tube plug.

2. When the liquid collector is separated from the test tube assembly, the movable part of the barrier is at its initial state and the lowest point of the lower face of the movable part represents the lowest point of the lower part of the tube plug.

In the above scheme, the combined structure may be used in the following ways.

1. In an initial state, the lower part of the liquid collector matches with and is fixedly attached to the test tube assembly, an outer surface of the lower part of the liquid collector matches an inner wall of the first passage, and a liquid outlet of the liquid collector is positioned above the upper faces of the movable parts of the barriers. The bottom of the lower part of the liquid collector abuts on or does not contact the upper faces of the movable parts. To collect liquid, the movable parts of the barriers of the tube plug are pressed by the lower part of the liquid collector, so that the movable parts are deflected downwards (i.e. a direction in which the liquid flows) and outwards and the outer surface of the lower part of the liquid collector abuts against the upper faces of the movable parts. Upon completion of liquid collecting, the residual liquid in the liquid collector is poured out and the liquid collector is separated from the test tube assembly, leaving the test tube assembly to be used by testing devices or testers.

2. In an initial state, the test tube assembly is separated from the liquid collector. To collect liquid, the liquid collector is fixedly attached to the test tube assembly, so that the outer surface of the lower part of the liquid collector matches with the inner wall of the first passage of the tube plug, the lower part of the liquid collector abuts against the upper faces of the movable parts of the barriers of the tube plug so that the movable parts are deflected downwards (i.e. a direction in which the liquid flows) and outwards, the outer surface of the lower part of the liquid collector tightly matches with both the inner wall of the first passage and the upper faces of the movable parts, and the liquid outlet of the liquid collector is in communication with the tube cavity of the test tube. Upon completion of liquid collecting, the residual liquid in the liquid collector is poured out and the liquid collector is separated from the test tube assembly, leaving the test tube assembly to be used by testing devices or testers.

3. In an initial state, the liquid collector matches with and fixedly attached to the test tube assembly in such a way that the outer surface of the lower part of the liquid collector matches with the inner wall of the first passage of the tube plug and abuts against the upper faces of the movable parts of the barriers of the tube plug so that the movable parts are deflected downwards (i.e. a direction in which the liquid flows) and outwards, and the liquid outlet of the liquid collector is in communication with the tube cavity of the test tube. The lower opening of the axial passage of the liquid collector is not higher than the lowest point of the lower part of the tube plug. Upon completion of liquid collecting, the residual liquid in the liquid collector is poured out and the liquid collector is separated from the test tube assembly, leaving the test tube assembly to be used by testing devices or testers.

The present solution is advantageous as follows.

1. The liquid level in the test tube can be accurately defined at such a specific position within the cavity of the test tube that ensures a liquid level required for testing by a test stripe and a testing device.

2. It is possible to alleviate or prevent effectively liquid from overflowing from the tube cavity of the test tube when the liquid is injected to the test tube, a test stripe is inserted to the test tube for testing, a testing sucker is inserted into the test tube, or the testing sucker is being used to evenly mix or suck the liquid in the test tube.

3. The recess of the tube plug plays a role of guide for the test stripe being inserted, the test stripe can be inserted with reduced resistance, and the test stripe can be conveniently inserted by a user as long as the end of the test stripe is aligned with the recess.

4. When the test stripe is being pulled out from the test tube assembly, the recess and the passage structure of the tube plug can effectively prevent the liquid in the test tube from being carried out by the test stripe and the testing sucker and can sweep off the residual liquid on the test stripe. Even if the liquid carried by the test stripe drops, the dropped liquid can be guided back to the test tube, so that contamination can be effectively avoided.

5. When the lower part of the liquid collector cooperates with the recess and the passage of the tube plug, the sealing capability is improved and liquid leaking can be prevented.

6. Starting from the manufacturing of a combined structure of a liquid collector with a test tube assembly in the prior art to the delivery of the combined structure to the consumer, the liquid collector is engaged with the test tube assembly for a long time, thus the barrier of the tube plug in the prior art has been in the deformed state for a long time, so that the barrier can hardly return to its initial state after the longtime fatigue of the barrier, resulting in the reduced leaking-proof capability. The recess structure of the tube plug of the present invention can improve the restoring capability of the barrier, so that the movable parts of the tube plug can restore in time, thereby achieving the sealing of the liquid.

7. The liquid in the test tube can be prevented from leaking both when the residual liquid is poured out from the liquid collector after the liquid injection into the test tube is completed and when the liquid collector is separated from the test tube.

Figure 1:
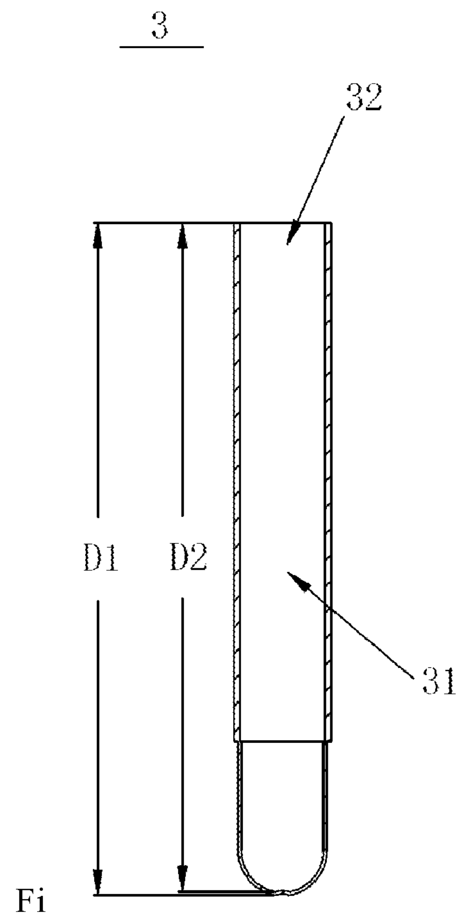
FIG. 1 schematically shows a test tube according to an embodiment of the present invention.

| List of reference numerals | | |
|---|---|---|
| 1: Liquid collector | 10: Lower part of liquid collector | |
| 101: Portion A | 101a: Outer surface of portion A | |
| 102: Portion B | 102a: Outer surface of portion B | |
| 11: Air exhaust passage | 111: Air outlet | 112: Air inlet |
| 12: Liquid guide passage | 121: Liquid inlet | 122: Liquid outlet |
| 13: Outer surface of lower part of liquid collector | | |

-continued

| List of reference numerals | | |
|---|---|---|
| 14: First annular protrusion | 15: First annular recess | |
| 16: Partition part | 17: Shielding body | 171: Window |
| 172: Shielding side wall | 173: Protection side wall | |
| 18: Handle | | |
| 2: Tube plug | 201: Lowest point of lower part of tube plug | |
| 202: Lowest point of lower part of tube plug | | |
| 21: First passage | 211: Wall of first passage | |
| 22: Second annular recess | 23: Second annular protrusion | |
| 241: Annular protrusion | 242: Annular protrusion | |
| 25: Barrier | 251: Upper face | 252: Fixed part |
| 253: Movable part | 254: Lateral side face | 26: Bottom face of tube plug |
| 3: Test tube | 31: Tube cavity | 32: Opening end |
| 33: Annular groove | 4: Test tube assembly | 5: Liquid level |
| D1: Height of test tube | D2: Height of tube cavity of test tube | |
| D3: Height of shielding body | | |
| D4: Distance from liquid level to lowest point of lower part of tube plug | | |

DETAILED DESCRIPTION OF THE EMBODIMENT

The present application will be further illustrated below in conjunction with the drawings. The described embodiments below are merely illustrative preferable embodiments without limiting the scope of the present application. In contrary, it is intended to encompass various modifications and equivalents thereof in the scope of the present application.

First Embodiment

Figure 2:
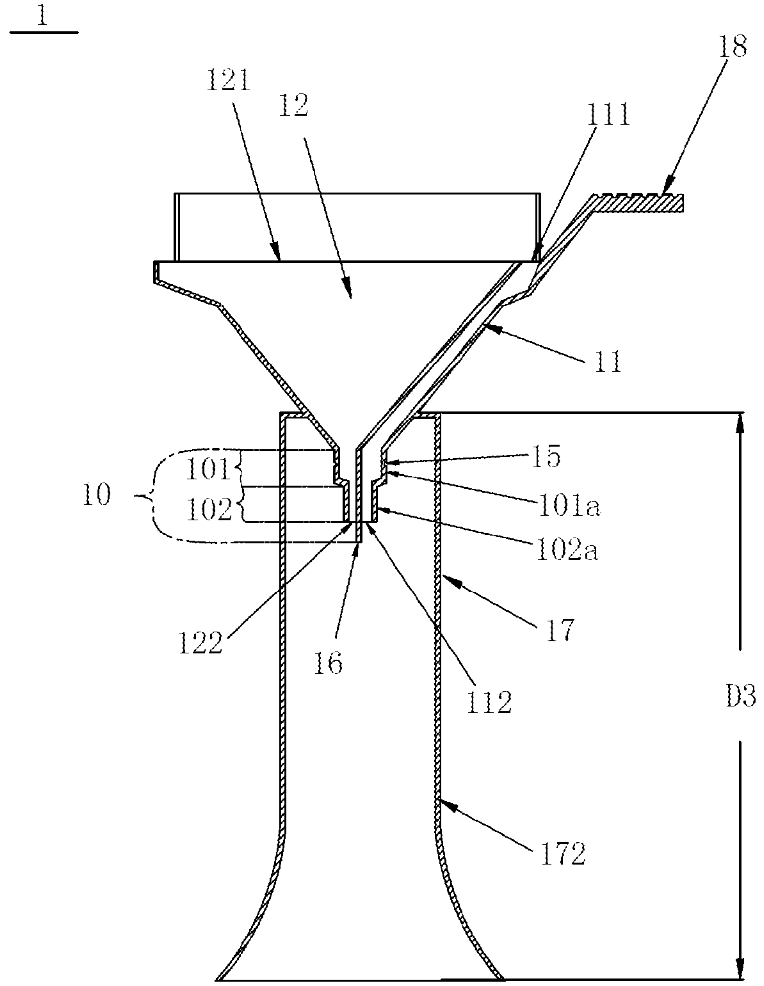
FIG. 2 schematically shows a liquid collector according to an embodiment of the present invention.
Figure 3:
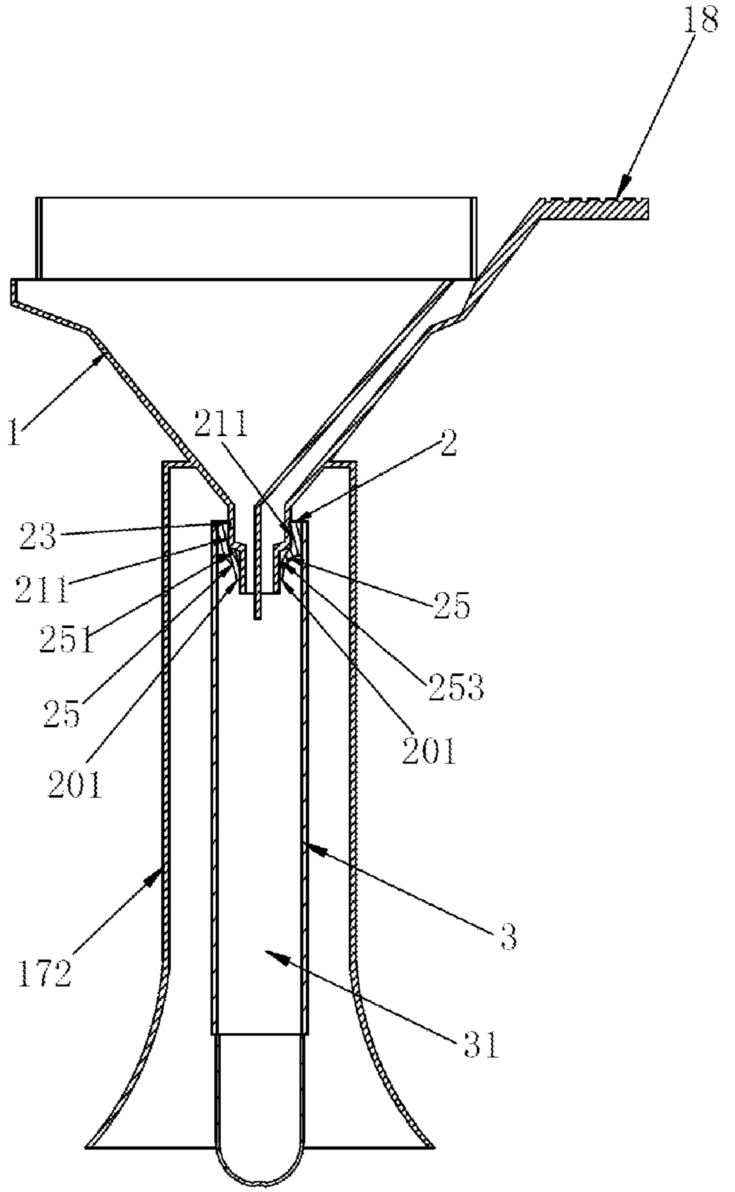
FIG. 3 schematically shows a combined structure according to an embodiment of the present invention.
Figure 10:
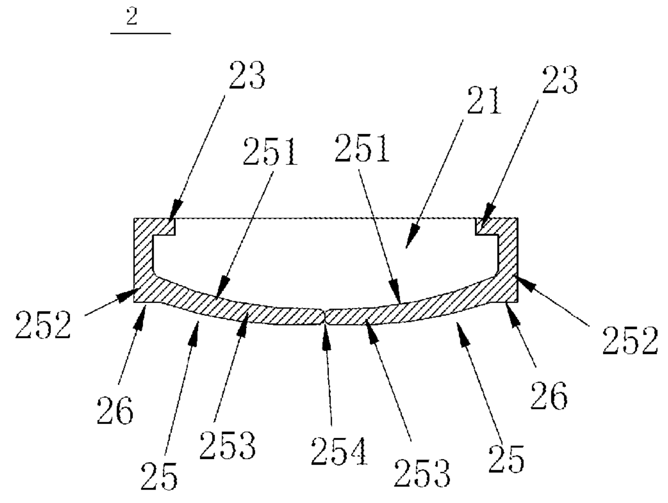
FIG. 10 schematically shows a tube plug according to an embodiment of the present invention.
Figure 13:
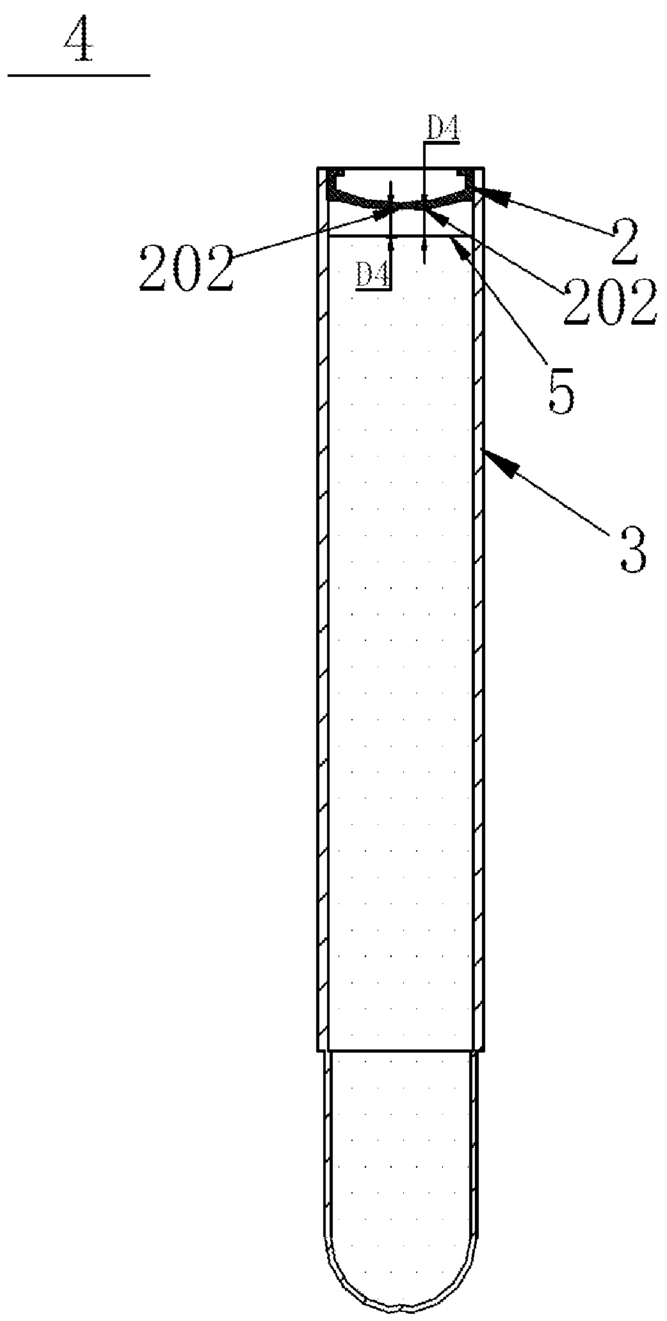
FIG. 13 schematically shows a test tube assembly according to an embodiment of the present invention.

The present application will be further described below in combination with FIGS. 1, 2, 3, 10 and 13.

A combined structure of a liquid collector with a test tube assembly includes a liquid collector 1 and a test tube assembly 4, where the test tube assembly 4 includes a tube plug 2 and a test tube 3.

The test tube 3 includes a tube cavity 31 and an opening end 32. The tube cavity has a height D2 of 103 mm, and the opening end of the test tube 3 has a diameter of 14 mm.

The upper part of the tube plug 2 is provided with a first axial passage 21, the wall 211 of which is provided with a second annular protrusion 23. The lower part of the tube plug 2 is provided with four barriers 25 of a sheet shape. Each of the barriers 25 includes a fixed part 252 and a movable part 253 extending from the fixed part 252 toward the inside of the test tube. The movable part 253 is deflectable relative to the fixed part 252, and may be formed integrally with the fixed part 252. The barriers 25 are integral parts of the tube plug 2.

When the lower part 10 of the liquid collector is not inserted in the tube plug 2, lateral side faces 254 of the four sheet-shaped barriers 25 abut one another.

Annular side wall of the liquid collector 1 surrounds an axial passage, in which a partition part 16 is arranged to separate the axial passage into a liquid guide passage 12 and an air exhaust passage 11 insulated from the liquid guide passage 12. The liquid guide passage 12 includes a liquid inlet 121 and a liquid outlet 122 which is a lower opening of the liquid guide passage 12. The air exhaust passage 11 includes an air outlet 111 and an air inlet 112 which is a lower opening of the air exhaust passage 11. The bottom end of the partition part 16 is lower than the liquid outlet 122 and the air inlet 112.

The lower part 10 of the liquid collector includes a portion A 101 and a portion B 102. The bottom of the portion A 101 shrinks and is connected to the portion B 102. A first annular recess 15 is arranged on the outer surface 101*a* of the portion A.

A shielding body 17 is arranged around the lower opening (including the liquid outlet 122 and the air inlet 112) of the axial passage of the liquid collector 1. In an implementation, the shielding body 17, which may be formed integrally with the liquid collector 1, may surround the test tube 3 at an angle of 360°, and have a height D3 of 99 mm.

The tube plug 2 is placed at the opening end 32 of the test tube 3, and the barriers 25 are positioned within the tube cavity of the test tube 3.

The lower part 10 of the liquid collector is connected to the test tube assembly 4 in a manner of inserting as follows.

The lower part 10 of the liquid collector is inserted in the first passage 21 of the tube plug 2, where the outer surface 101*a* of the portion A abuts on the wall 211 of the first passage 21. Particularly, the first annular recess 15 on the outer surface 101*a* of the portion A cooperates with the second annular protrusion 23 on the wall 211 of the first passage 21, and the portion B of the lower part 10 of the liquid collector pushes the four barriers 25 downwards and outwards, so that the outer surface 102*a* of the portion B abuts on the upper faces 251 of the four barriers 25. Here, the lower part 10 of the liquid collector axially passes through the tube plug 2.

The liquid outlet 122 and the air inlet 112 of the liquid collector 1 are positioned in the tube cavity 31 of the test tube 3, are distanced from the opening of the test tube by 26 mm, and are lower than the lowest point 201 of the lower part of the tube plug by 8 mm. The outer diameter of the portion B has an outer diameter of 8 mm at the point abutting on the upper faces 251 of the barriers 25.

Upon completion of liquid collecting, the residual liquid in the liquid collector 1 may be poured out and the liquid collector 1 is separated from the test tube assembly 4, in this case, the liquid level 5 in the test tube 3 is distanced from the lowest point 202 of the lower part of the tube plug by a distance D4 of 4 mm.

Second Embodiment

Figure 4:
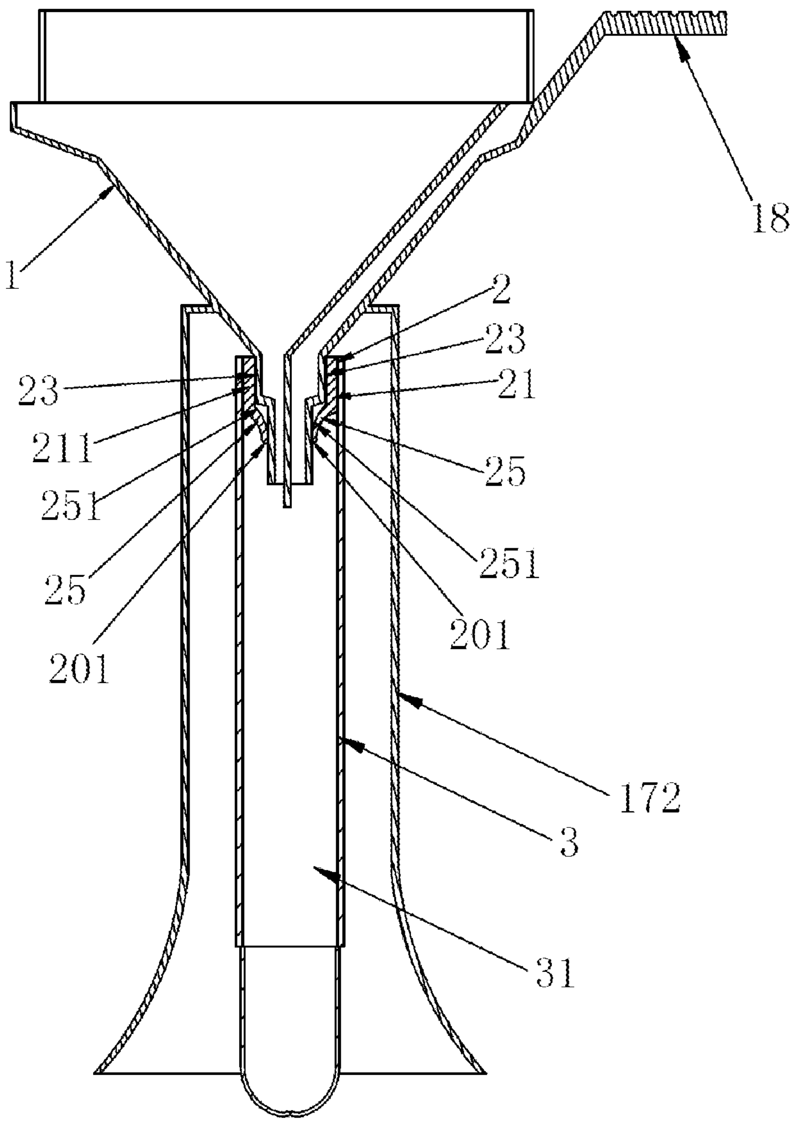
FIG. 4 schematically shows a combined structure according to another embodiment of the present invention.
Figure 9:
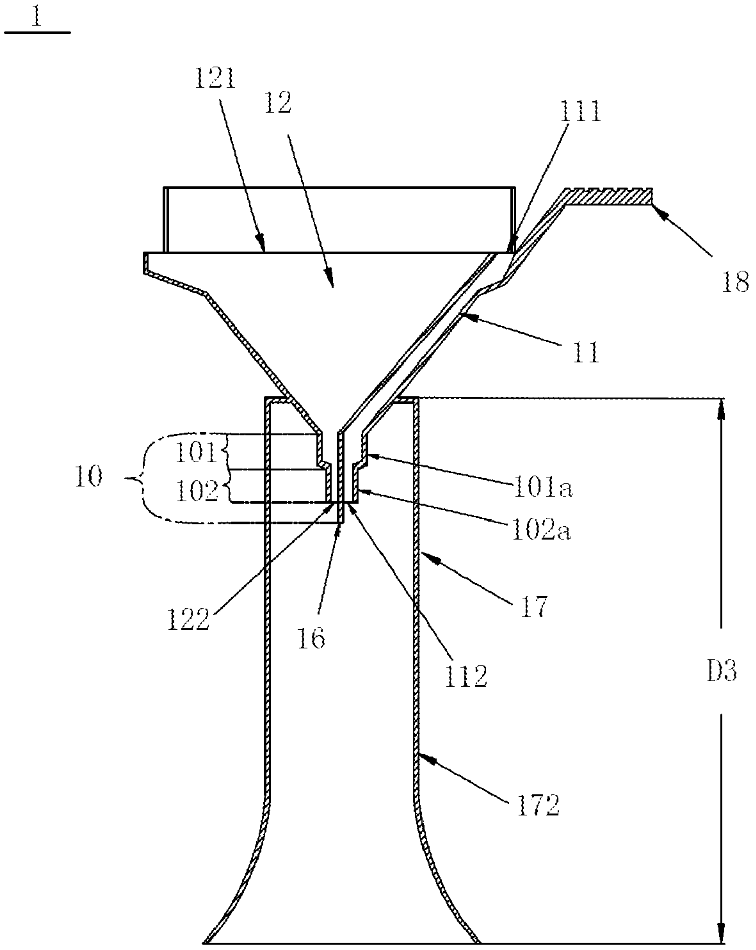
FIG. 9 schematically shows a liquid collector according to yet another embodiment of the present invention.
Figure 11:
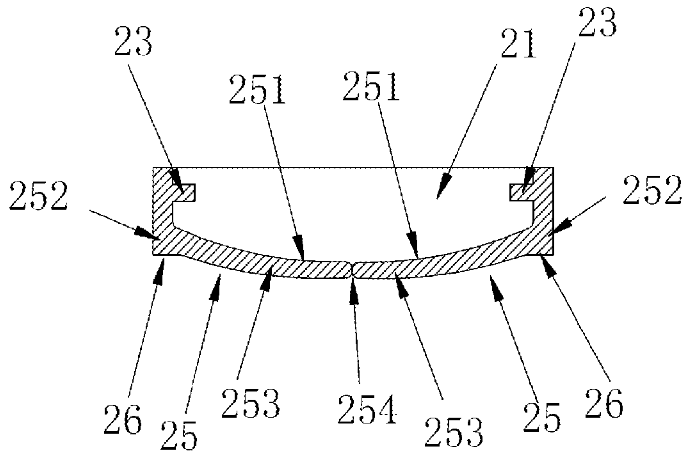
FIG. 11 schematically shows a tube plug according to another embodiment of the present invention.
Figure 14:
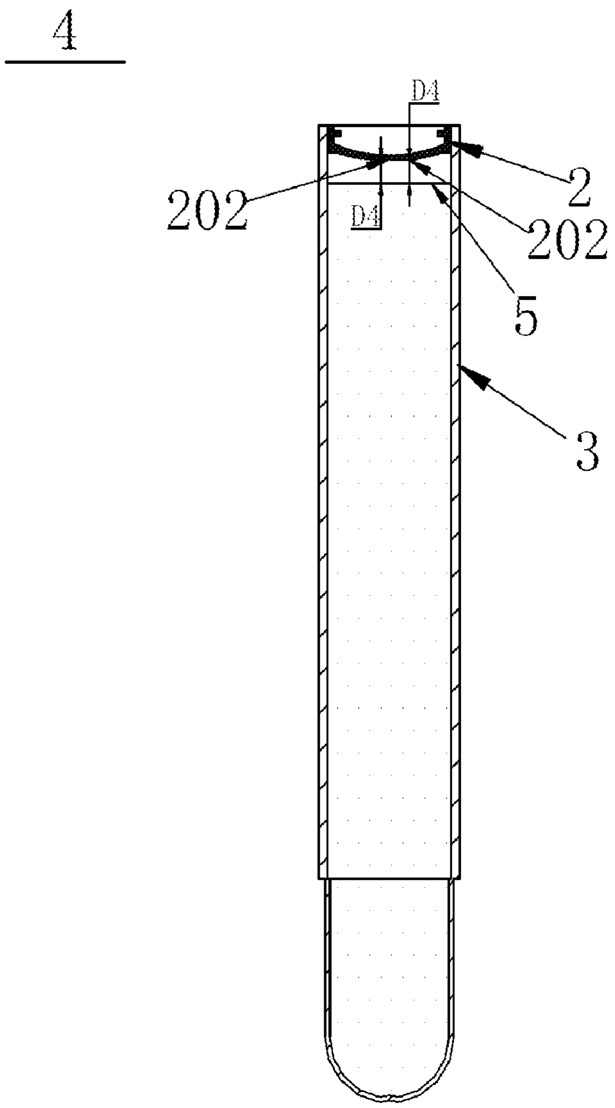
FIG. 14 schematically shows a test tube assembly according to another embodiment of the present invention.

The present application will be further described below in combination with FIGS. 1, 4, 9, 11 and 14.

A combined structure of a liquid collector with a test tube assembly includes a liquid collector 1, a tube plug 2 and a test tube 3.

The test tube 3 includes a tube cavity 31 and an opening end 32. The tube cavity has a height D2 of 110 mm, and the opening end of the test tube 3 has a diameter of 13.5 mm.

The upper part of the tube plug 2 is provided with a first axial passage 21, the wall 211 of which is provided with a second annular protrusion 23. The lower part of the tube plug 2 is provided with four barriers 25 of a sheet shape. Each of the barriers 25 includes a fixed part 252 and a movable part 253 extending from the fixed part 252 toward the inside of the test tube. The movable part 253 is deflectable relative to the fixed part 252, and may be formed integrally with the fixed part 252. The barriers 25 are integral parts of the tube plug 2.

The barriers 25 are below the second annular protrusion 23. When the lower part 10 of the liquid collector is not inserted in the tube plug 2, lateral side faces 254 of the four sheet-shaped barriers 25 abut one another.

Annular side wall of the liquid collector 1 surrounds an axial passage, in which a partition part 16 is arranged to separate the axial passage into a liquid guide passage 12 and an air exhaust passage 11 insulated from the liquid guide passage 12. The liquid guide passage 12 includes a liquid inlet 121 and a liquid outlet 122 which is a lower opening of the liquid guide passage 12. The air exhaust passage 11 includes an air outlet 111 and an air inlet 112 which is a lower opening of the air exhaust passage 11.

The lower part 10 of the liquid collector includes a portion A 101 and a portion B 102. The bottom of the portion A 101 shrinks and is connected to the portion B 102. A first annular recess 15 is arranged on the outer surface 101*a* of the portion A.

A shielding body 17 is arranged around the lower opening (including the liquid outlet 122 and the air inlet 112) of the axial passage of the liquid collector 1. In an implementation, the shielding body 17, which may be formed integrally with the liquid collector 1, surrounds the test tube 3 at an angle of 360°, and has a height D3 of 110 mm.

The tube plug 2 is placed at the opening end 32 of the test tube 3, and the barriers 25 are positioned within the tube cavity of the test tube 3.

The lower part 10 of the liquid collector is connected to the test tube assembly in a manner of inserting as follows.

The lower part 10 of the liquid collector is inserted in the first passage 21 of the tube plug 2, where the outer surface 101*a* of the portion A abuts on both the wall 211 of the first passage 21 and the second annular protrusion 23 arranged on the wall 211 of the first passage 21. Particularly, the portion B 102 of the lower part 10 of the liquid collector pushes the four barriers 25 downwards and outwards (lateral), so that the outer surface 102*a* of the portion B abuts on the upper faces 251 of the four barriers 25. Here, the lower part 10 of the liquid collector axially passes through the tube plug 2.

The liquid outlet 122 and the air inlet 112 of the liquid collector 1 are positioned in the tube cavity 31 of the test tube 3, are distanced from the opening of the test tube by 23 mm, and are lower than the lowest point 201 of the lower part of the tube plug by 5 mm. The outer diameter of the portion B has an outer diameter of 9 mm at the point abutting on the upper faces 251 of the barriers 25.

Upon completion of liquid collecting, the residual liquid in the liquid collector 1 may be poured out and the liquid collector 1 is separated from the test tube assembly 4, in this case, the liquid level 5 in the test tube 3 is distanced from the lowest point 202 of the lower part of the tube plug by a distance D4 of 4.5 mm.

Third Embodiment

Figure 5:
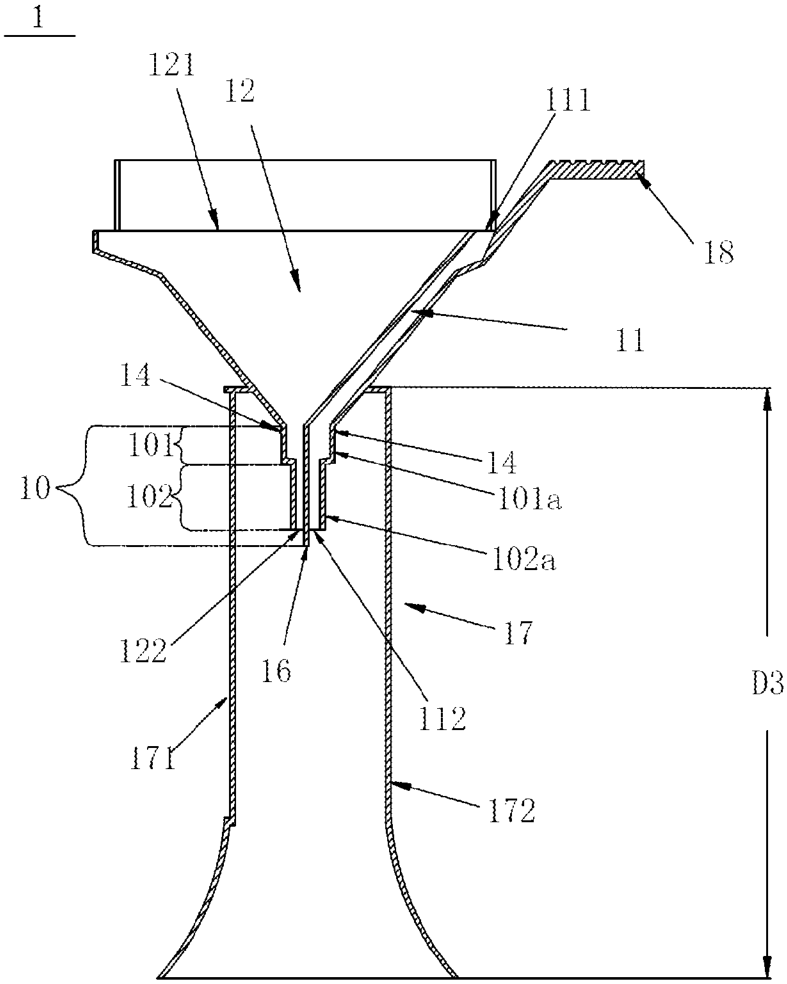
FIG. 5 schematically shows a liquid collector according to another embodiment of the present invention.
Figure 6:
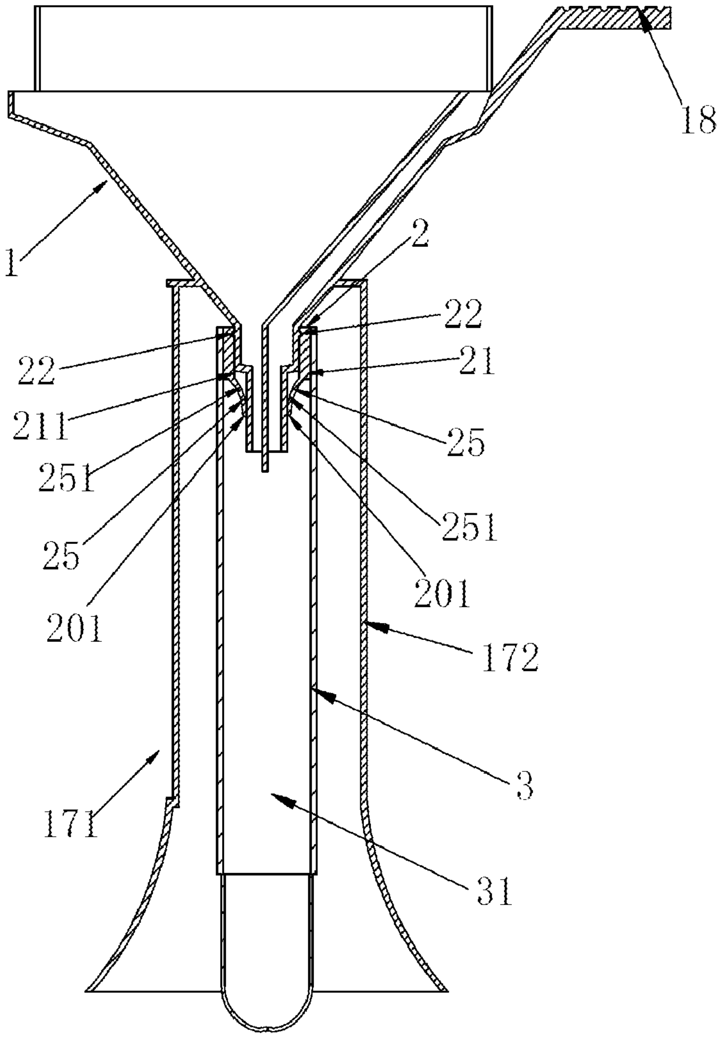
FIG. 6 schematically shows a combined structure according to still another embodiment of the present invention.
Figure 12:
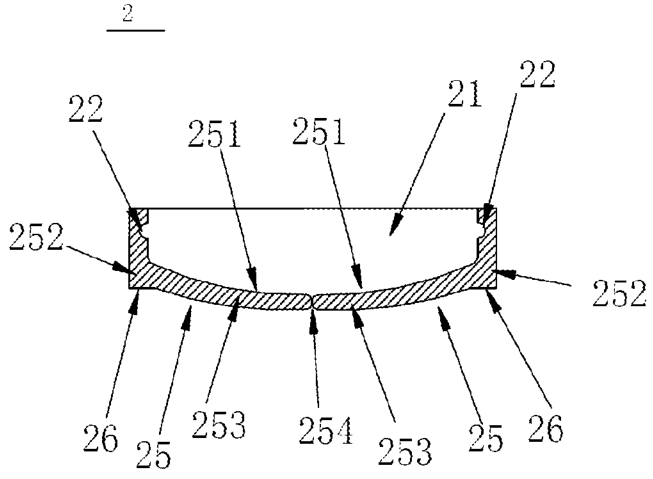
FIG. 12 schematically shows a tube plug according to still another embodiment of the present invention.
Figure 15:
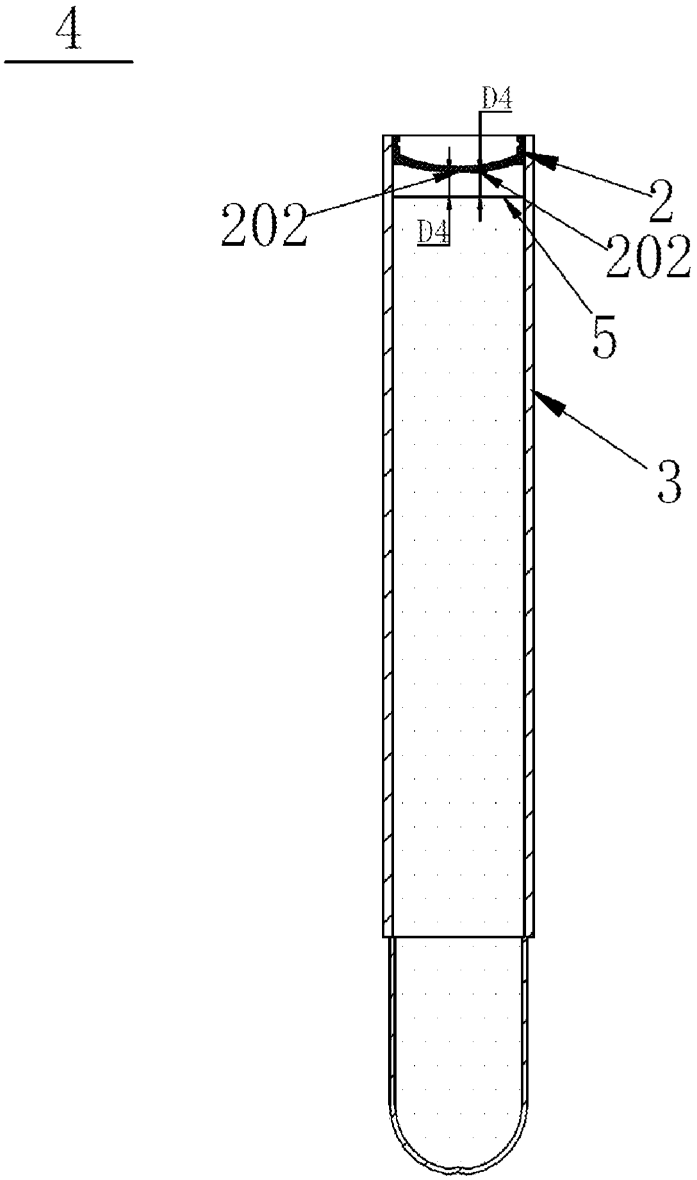
FIG. 15 schematically shows a test tube assembly according to still another embodiment of the present invention.

The present application will be further described below in combination with FIGS. 1, 5, 6, 12 and 15.

A combined structure of a liquid collector with a test tube assembly includes a liquid collector 1, a tube plug 2 and a test tube 3.

The test tube 3 includes a tube cavity 31 and an opening end 32. The tube cavity has a height D2 of 101 mm, and the opening end of the test tube 3 has a diameter of 14.5 mm.

The upper part of the tube plug 2 is provided with a first axial passage 21, the wall 211 of which is provided with a second annular recess 22. The lower part of the tube plug 2 is provided with four barriers 25 of a sheet shape. Each of the barriers 25 includes a fixed part 252 and a movable part 253 extending from the fixed part 252 toward the inside of the test tube. The movable part 253 is deflectable relative to the fixed part 252, and may be formed integrally with the fixed part 252. The barriers 25 are integral parts of the tube plug 2.

When the lower part 10 of the liquid collector is not inserted in the tube plug 2, lateral side faces 254 of the four sheet-shaped barriers 25 abut one another.

Annular side wall of the liquid collector 1 surrounds an axial passage, in which a partition part 16 is arranged to separate the axial passage into a liquid guide passage 12 and an air exhaust passage 11 insulated from the liquid guide passage 12. The liquid guide passage 12 includes a liquid inlet 121 and a liquid outlet 122 which is a lower opening of the liquid guide passage 12. The air exhaust passage 11 includes an air outlet 111 and an air inlet 112 which is a lower opening of the air exhaust passage 11.

The lower part 10 of the liquid collector includes a portion A 101 and a portion B 102. The bottom of the portion A 101 shrinks and is connected to the portion B 102. A first annular protrusion 14 is arranged on the outer surface 101*a* of the portion A.

A shielding body 17 is arranged around the lower opening (including the liquid outlet 122 and the air inlet 112) of the axial passage of the liquid collector 1. The shielding body 17 includes a window 171 for scanning and inspecting. In an implementation, the shielding body 17, which may be formed integrally with the liquid collector 1, surrounds the test tube 3 at an angle of 360°, and has a height D3 of 100 mm.

The tube plug 2 is placed at the opening end 32 of the test tube 3, and the barriers 25 are positioned within the tube cavity of the test tube 3.

The lower part 10 of the liquid collector is connected to the test tube assembly in a manner of inserting as follows.

The lower part 10 of the liquid collector is inserted in the first passage 21 of the tube plug 2, where the outer surface 101*a* of the portion A abuts on the wall 211 of the first passage 21. Also, the first annular protrusion 14 on the outer surface 101*a* of the portion A matches with the second annular recess 22 arranged on the wall 211 of the first passage 21. Particularly, the portion B 102 of the lower part 10 of the liquid collector pushes the four barriers 25 downwards and outwards (lateral), so that the outer surface 102*a* of the portion B abuts on the upper faces 251 of the four barriers 25. Here, the lower part 10 of the liquid collector axially passes through the tube plug 2.

The liquid outlet 122 and the air inlet 112 of the liquid collector 1 are positioned in the tube cavity 31 of the test tube 3, are distanced from the opening of the test tube by 15 mm, and are lower than the lowest point 201 of the lower part of the tube plug by 5 mm. The outer diameter of the portion B 102 has an outer diameter of 8.5 mm at the point abutting on the upper faces 251 of the barriers 25.

Upon completion of liquid collecting, the residual liquid in the liquid collector 1 may be poured out and the liquid collector 1 is separated from the test tube assembly 4, in this case, the liquid level 5 in the test tube 3 is distanced from the lowest point 202 of the lower part of the tube plug by a distance D4 of 5 mm.

Fourth Embodiment

Figure 7:
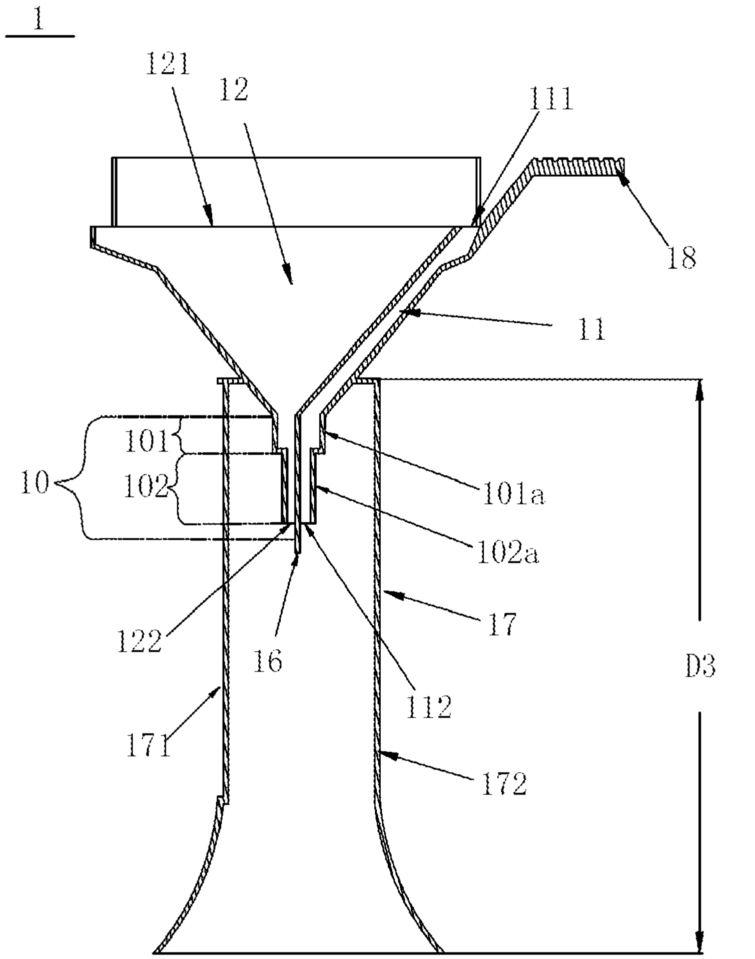
FIG. 7 schematically shows a liquid collector according to still another embodiment of the present invention.
Figure 8:
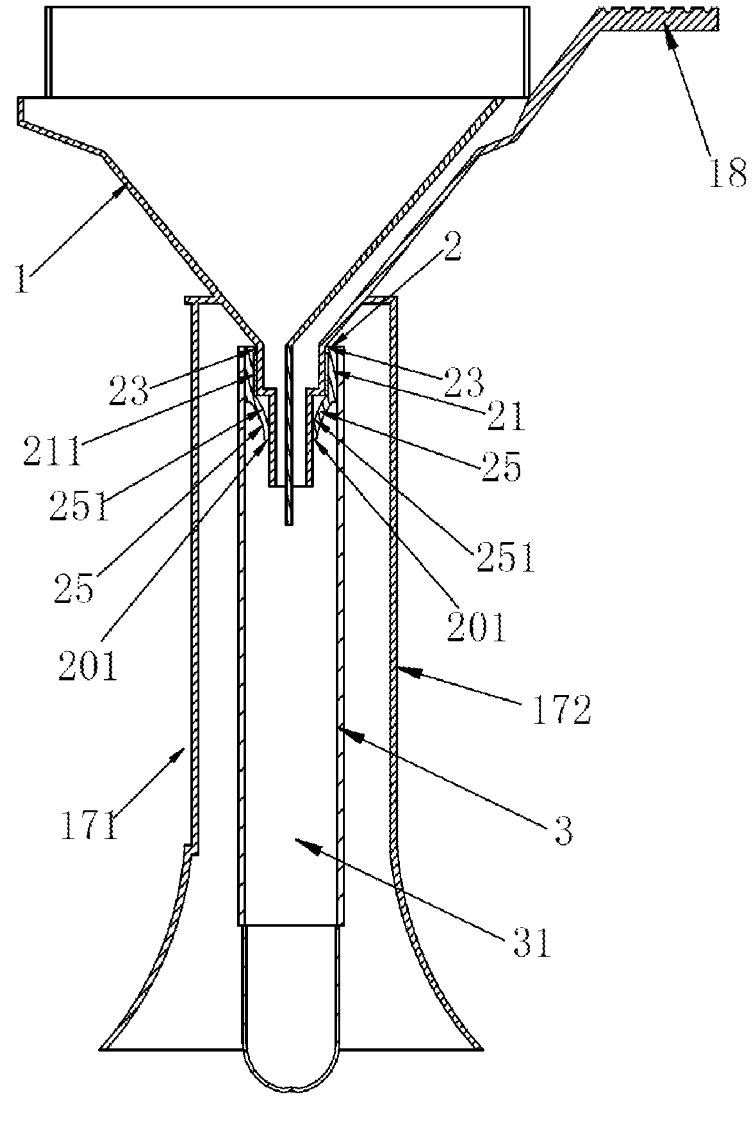
FIG. 8 schematically shows a combined structure according to yet another embodiment of the present invention.

The present application will be further described below in combination with FIGS. 1, 7, 8, 10 and 13.

A combined structure of a liquid collector with a test tube assembly includes a liquid collector 1, a tube plug 2 and a test tube 3.

The test tube 3 includes a tube cavity 31 and an opening end 32. The tube cavity has a height of 102 mm, and the opening end of the test tube 3 has a diameter of 14.5 mm.

The upper part of the tube plug 2 is provided with a first axial passage 21, the wall 211 of which is provided with a second annular protrusion 23. The lower part of the tube plug 2 is provided with four barriers 25 of a sheet shape. Each of the barriers 25 includes a fixed part 252 and a movable part 253 extending from the fixed part 252 toward the inside of the test tube. The movable part 253 is deflectable relative to the fixed part 252, and may be formed integrally with the fixed part 252. The barriers 25 are integral parts of the tube plug 2.

When the lower part 10 of the liquid collector is not inserted in the tube plug 2, lateral side faces 254 of the four sheet-shaped barriers 25 abut one another.

Annular side wall of the liquid collector 1 surrounds an axial passage, in which a partition part 16 is arranged to separate the axial passage into a liquid guide passage 12 and an air exhaust passage 11 insulated from the liquid guide passage 12. The liquid guide passage 12 includes a liquid inlet 121 and a liquid outlet 122 which is a lower opening of the liquid guide passage 12. The air exhaust passage 11 includes an air outlet 111 and an air inlet 112 which is a lower opening of the air exhaust passage 11.

The lower part 10 of the liquid collector includes a portion A 101 and a portion B 102. The bottom of the portion A 101 shrinks and is connected to the portion B 102.

A shielding body 17 is arranged around the lower opening (including the liquid outlet 122 and the air inlet 112) of the axial passage of the liquid collector 1. The shielding body 17 includes a window 171 for scanning and inspecting. In an implementation, the shielding body 17, which may be formed integrally with the liquid collector 1, surrounds the test tube 3 at an angle of 360°, and has a height D3 of 100 mm.

The tube plug 2 is placed at the opening end 32 of the test tube 3, and the barriers 25 are positioned within the tube cavity of the test tube 3.

The lower part 10 of the liquid collector is connected to the test tube assembly in a manner of inserting as follows.

The lower part 10 of the liquid collector is inserted in the first passage 21 of the tube plug 2, and the outer surface 101*a* of the portion A abuts on the second annular protrusion 23 arranged on the wall 211 of the first passage 21. Particularly, the portion B 102 of the lower part 10 of the liquid collector pushes the four barriers 25 downwards and outwards (lateral), so that the outer surface 102*a* of the portion B abuts on the upper faces 251 of the four barriers 25.

The liquid outlet 122 and the air inlet 112 of the liquid collector 1 are positioned in the tube cavity 31 of the test tube 3, are distanced from the opening of the test tube by 15 mm, and are lower than the lowest point 201 of the lower part of the tube plug by 5 mm. The outer diameter of the portion B 102 has an outer diameter of 9.5 mm at the point abutting on the upper faces 251 of the barriers 25.

Upon completion of liquid collecting, the residual liquid in the liquid collector 1 may be poured out and the liquid collector 1 is separated from the test tube assembly 4, in this case, the liquid level 5 in the test tube 3 is distanced from the lowest point 202 of the lower part of the tube plug by a distance D4 of 6 mm.

Fifth Embodiment

Figure 16:
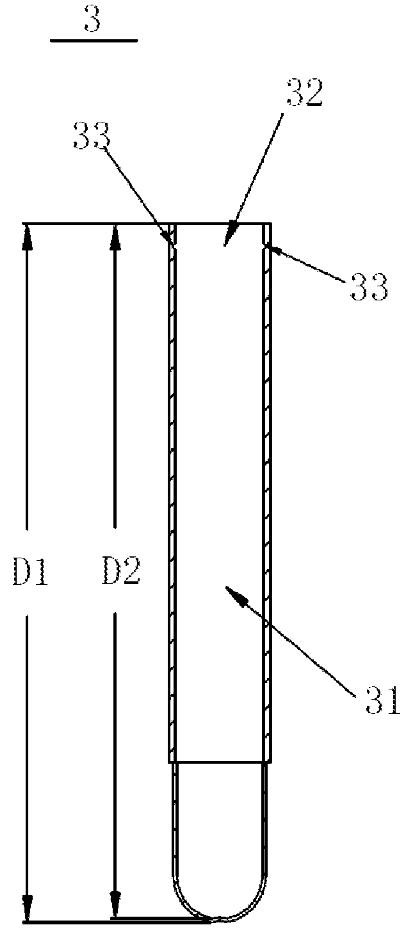
FIG. 16 schematically shows a test tube according to another embodiment of the present invention.
Figure 17:
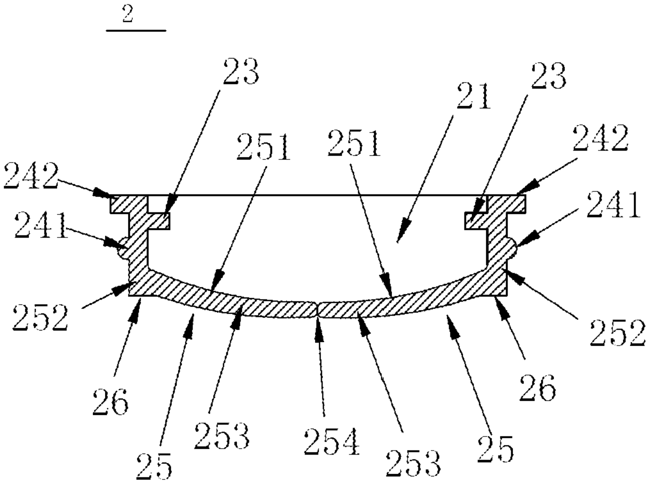
FIG. 17 schematically shows a tube plug according to yet another embodiment of the present invention.
Figure 18:
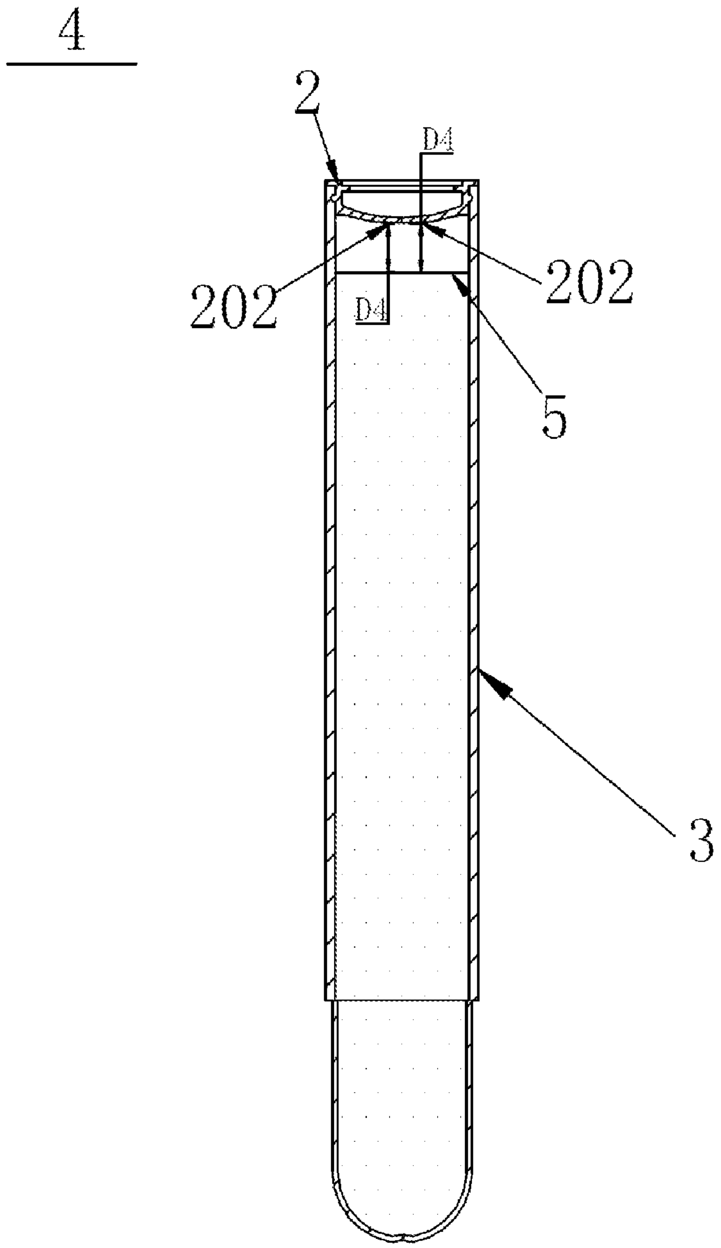
FIG. 18 schematically shows a test tube assembly according to yet another embodiment of the present invention.
Figure 19:
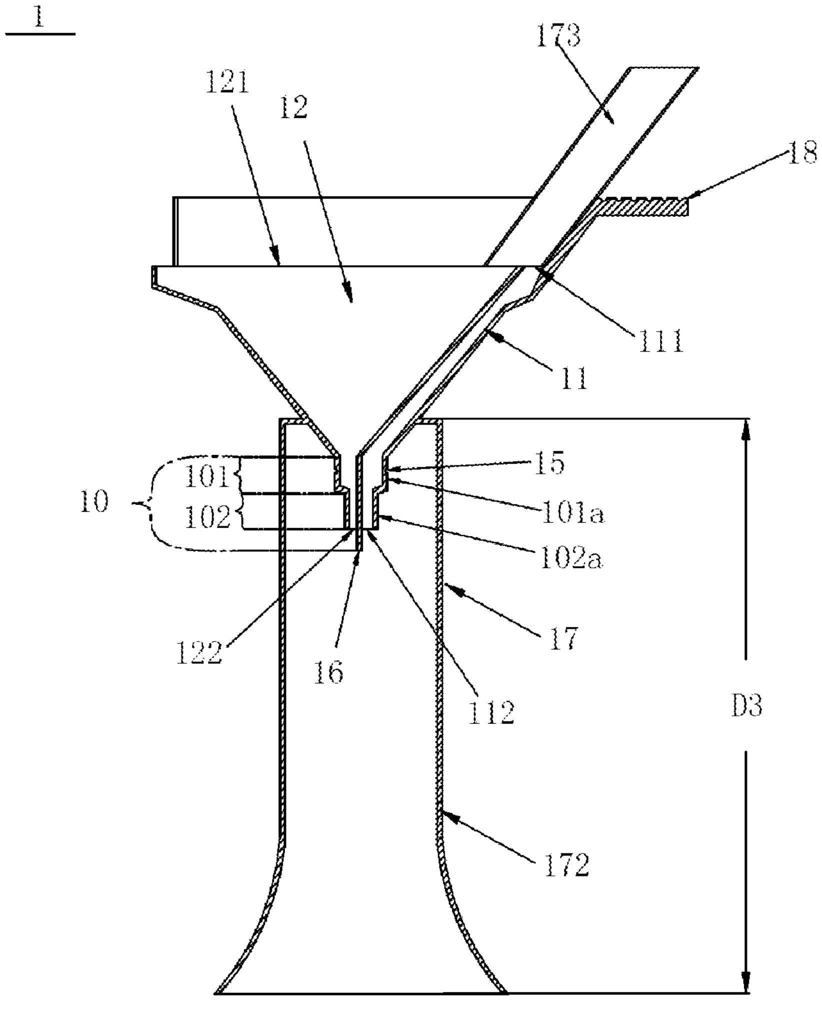
FIG. 19 schematically shows a liquid collector according to yet another embodiment of the present invention.
Figure 20:
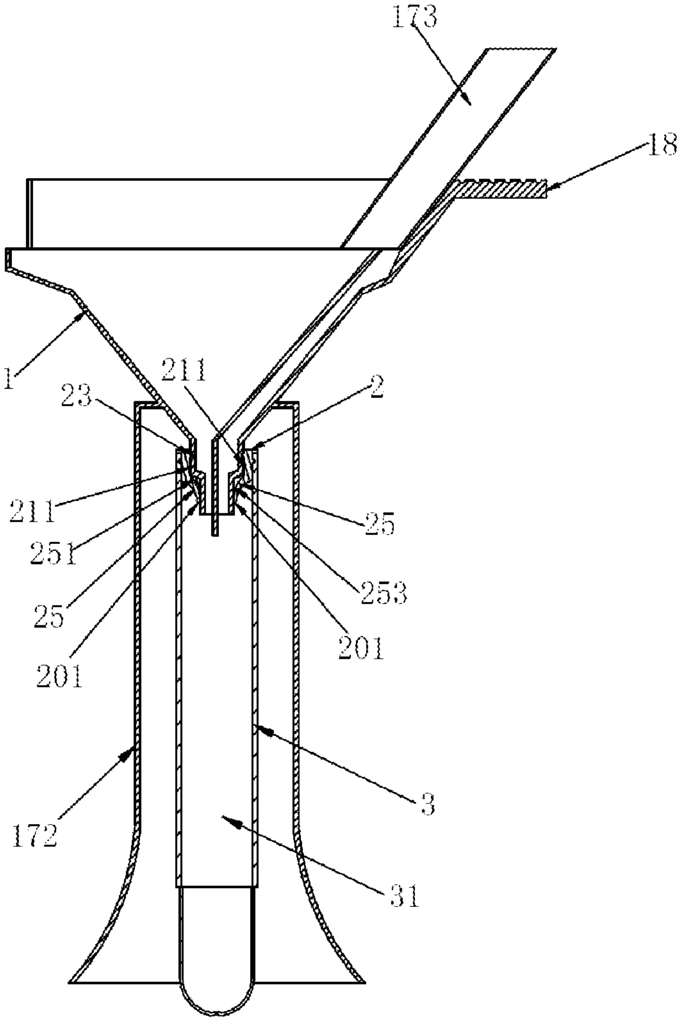
FIG. 20 schematically shows a combined structure according to yet another embodiment of the present invention.

The present application will be further described below in combination with FIGS. 16, 17, 18, 19 and 20.

A combined structure of a liquid collector with a test tube assembly includes a liquid collector 1 and a test tube assembly 4, which includes a tube plug 2 and a test tube 3.

The test tube 3 includes a tube cavity 31 and an opening end 32. An annular groove 33 is arranged on the inner wall of the test tube 3. The tube cavity has a height D2 of 103 mm, and the opening end of the test tube 3 has a diameter of 14 mm.

The upper part of the tube plug 2 is provided with a first axial passage 21, the wall 211 of which is provided with a second annular protrusion 23. The lower part of the tube plug 2 is provided with four barriers 25 of a sheet shape. Each of the barriers 25 includes a fixed part 252 and a movable part 253 extending from the fixed part 252 toward the inside of the test tube. The movable part 253 is deflectable relative to the fixed part 252, and may be formed integrally with the fixed part 252. The barriers 25 are integral parts of the tube plug 2. An annular protrusion 241 and an annular protrusion 242 are arranged on the outer wall of the body of the tube plug 2.

In the case of the test tube assembly 4, the tube plug 2 is placed at the opening end 32 of the test tube 3, where the outer wall of the body of the tube plug 2 abuts against the wall of the tube cavity of the test tube 3, the annular protrusion 241 on the outer wall of the body of the tube plug 2 cooperates with the annular groove 33 on the cavity wall of the test tube 3, and the annular protrusion 242 cooperates with the top end face of the test tube 3. The barriers 25 are positioned within the tube cavity of the test tube 3.

When the lower part 10 of the liquid collector is not inserted in the tube plug 2, lateral side faces 254 of the four sheet-shaped barriers 25 abut one another.

Annular side wall of the liquid collector 1 surrounds an axial passage, in which a partition part 16 is arranged to separate the axial passage into a liquid guide passage 12 and an air exhaust passage 11 insulated from the liquid guide passage 12. The liquid guide passage 12 includes a liquid inlet 121 and a liquid outlet 122 which is a lower opening of the liquid guide passage 12. The air exhaust passage 11 includes an air outlet 111 and an air inlet 112 which is a lower opening of the air exhaust passage 11. The bottom end of the partition part 16 is lower than the liquid outlet 122 and the air inlet 112.

The lower part 10 of the liquid collector includes a portion A 101 and a portion B 102. The bottom of the portion A 101 shrinks and is connected to the portion B 102. A first annular recess 15 is arranged on the outer surface 101*a* of the portion A.

A shielding body 17 is arranged around the lower opening (including the liquid outlet 122 and the air inlet 112) of the axial passage of the liquid collector 1. The shielding body 17, which may be formed integrally with the liquid collector 1, surrounds the test tube 3 at an angle of 360°, and has a height D3 of 99 mm. The liquid collector 1 includes a handle 18, which is provided with a protection side wall 173 configured for preventing liquid from sputtering on the handle 18.

The lower part 10 of the liquid collector is connected to the test tube assembly 4 in a manner of inserting as follows.

The lower part 10 of the liquid collector is inserted in the first passage 21 of the tube plug 2, and the outer surface 101*a* of the portion A abuts on the wall 211 of the first passage 21. Here, the first annular recess 15 on the outer surface 101*a* of the portion A of the liquid collector cooperates with the second annular protrusion 23 arranged on the wall 211 of the first passage 21. Particularly, the portion B 102 of the lower part 10 of the liquid collector pushes the four barriers 25 downwards and outwards (lateral), so that the outer surface 102*a* of the portion B abuts on the upper faces 251 of the four barriers 25. Here, the lower part 10 of the liquid collector axially passes through the tube plug 2.

The liquid outlet 122 and the air inlet 112 of the liquid collector 1 are positioned in the tube cavity 31 of the test tube 3, are distanced from the opening of the test tube by 26 mm, and are lower than the lowest point 201 of the lower part of the tube plug by 8 mm. The outer diameter of the portion B 102 has an outer diameter of 8 mm at the point abutting on the upper faces 251 of the barriers 25.

Upon completion of liquid collecting, the residual liquid in the liquid collector 1 may be poured out and the liquid collector 1 is separated from the test tube assembly 4, in this case, the liquid level 5 in the test tube 3 is distanced from the lowest point 202 of the lower part of the tube plug by a distance D4 of 5 mm.

The invention claimed is:

1. A combined structure of a liquid collector with a test tube assembly, comprising a liquid collector and a test tube assembly, wherein the test tube assembly includes a test tube and a tube plug placed at an opening end of the test tube, an axial passage is formed in the liquid collector, and a lower part of the liquid collector is connected to the test tube assembly, wherein, the tube plug includes barriers, each of which includes a fixed part and a movable part extending from the fixed part toward the inside of the test tube, and the movable part is deflectable relative to the fixed part and includes an upper face, a lower face and a lateral side face connecting the upper and lower faces; wherein an axial recess is formed above the upper face of the movable part and surrounded by the upper faces of the moveable parts and an inner wall of a first passage above the upper face of the movable part, the lower part of the liquid collector fits in the axial recess, the lower part of the liquid collector is inserted in the first passage, and an outer surface of the lower part of the liquid collector matches with and fixedly attached to the inner wall of the first passage, and wherein the lower part of the liquid collector passes through the recess of the tube plug and abuts against the movable parts so that the movable parts are deflected downwards and outwards, the barriers are positioned in a cavity of the test tube, and a lower opening of the axial passage of the liquid collector is positioned in the cavity of the test tube and is lower than or at the same level as the lowest point of the lower part of the tube plug;

wherein the first passage is used for the fixed connection to the liquid collector, eliminating the releasing of the cooperation between the test tube assembly and the liquid collector, preventing the liquid at the connection between the liquid collector and the test tube assembly from dropping outside of the test tube assembly when the liquid collector is separated from the test tube assembly, and preventing liquid from being carried by the test stripe and dropping outside of the test tube assembly when the test stripe is pulled out of the test tube, and is further used as a guide for the liquid collector being connected to the test tube assembly.

2. The combined structure of claim 1, wherein the lower part of the liquid collector includes a portion A and a portion B, a bottom of the portion A shrinks and is connected to the portion B, an outer surface of the portion A matches the wall of the first passage, and an outer surface of the portion B abuts against the upper faces of the movable parts.

3. The combined structure of claim 2, wherein the portion B has an outer diameter no less than 5.5 mm and no more than 11 mm at a point abutting against the upper faces of the movable parts.

4. The combined structure of claim 1, wherein when the lower opening of the axial passage of the liquid collector is lower than the lowest point of the lower part of the tube plug, the lower opening is lower than the lowest point of the lower part of the tube plug by at least 1 mm but no more than 20 mm.

5. The combined structure of claim 4, wherein the portion B has an outer diameter no less than 5.5 mm and no more than 11 mm at a point abutting against the upper faces of the movable parts.

6. The combined structure of claim 5, wherein the height of the tube plug in the tube cavity of the test tube is no less than 5% and no more than 20% of the height of the tube cavity of the test tube, or no less than 8% and no more than 16% of the height of the tube cavity of the test tube.

7. The combined structure of claim 1, wherein the cavity of the test tube has a height no less than 90 mm and no more than 115 mm, and the lower opening of the axial passage of the liquid collector is spaced from the opening of the test tube by no less than 5% of the height of the cavity of the test tube and no more than 35% of the height of the cavity of the test tube.

8. The combined structure of claim 7, wherein a shielding body is arranged around the lower opening of the axial passage of the liquid collector and configured to prevent liquid outside of the passage of the liquid collector from spurting onto the outer surface of the test tube, a shielding wall of the shielding body surrounds the test tube by an angle no more than 360°, and the shielding body has a height no less than 70% of the height of the test tube.

9. The combined structure of claim 1, wherein a protection side wall is arranged around a handle of the liquid collector and configured for preventing liquid from sputtering on the handle.

10. The combined structure of claim 1, wherein upon completion of liquid collecting, after the residual liquid in the liquid collector is poured out and the liquid collector is separated from the test tube assembly, a liquid level in the test tube is spaced from the lowest point of the lower part of the tube plug by a distance no less than 3.5 mm and no more than 15 mm, or no less than 4.5 mm and no more than 12.5 mm.

11. The combined structure of claim 1, wherein in an initial state, the lower part of the liquid collector matches with and is fixedly attached to the test tube assembly, an outer surface of the lower part of the liquid collector matches an inner wall of the first passage, a liquid outlet of the liquid collector is positioned above the upper faces of the movable parts of the barriers, and the movable parts of the barriers are not deflected; and in a use state, the lower part of the liquid collector abuts against the movable parts of the barriers of the tube plug, so that the movable parts are deflected downwards and outwards, and the outer surface of the lower part of the liquid collector abuts on the upper faces of the movable parts.

12. The combined structure of claim 1, wherein a partition part is arranged in the axial passage of the liquid collector to separate the axial passage into a liquid guide passage and an air exhaust passage insulated from the liquid guide passage, the smallest cross-section of the liquid guide passage has an area no less than 3 $mm^2$ and no more than 18 $mm^2$, and the smallest cross-section of the air exhaust passage has an area no less than 3 $mm^2$ and no more than 18 $mm^2$; and wherein the liquid in the test tube assembly is prevented from leaking both when the residual liquid in the liquid collector is poured out upon completion of liquid collecting and after the liquid collector is separated from the test tube assembly.

13. The combined structure of claim 12, wherein when the smallest cross-section of the liquid guide passage has an area more than 10 $mm^2$, the smallest cross-section of the air discharge passage has an area no less than 25% of the area of the smallest cross-section of the liquid guide passage, so that the liquid can be guided smoothly and fast by the liquid collector during liquid collecting.

14. The combined structure of claim 1, wherein in an initial state, the test tube assembly is separated from the liquid collector; and to collect liquid, the liquid collector is fixedly attached to the test tube assembly, so that the outer surface of the lower part of the liquid collector matches with the inner wall of the first passage of the tube plug, the lower part of the liquid collector abuts against the upper faces of the movable parts of the barriers of the tube plug so that the movable parts are deflected downwards and outwards, the outer surface of the lower part of the liquid collector tightly matches with both the inner wall of the first passage and the upper faces of the movable parts, and the liquid outlet of the liquid collector is in communication with the tube cavity of the test tube.

15. The combined structure of claim 1, wherein in an initial state, the liquid collector matches with and fixedly attached to the test tube assembly in such a way that the outer surface of the lower part of the liquid collector matches with the inner wall of the first passage of the tube plug and abuts against the upper faces of the movable parts of the barriers of the tube plug so that the movable parts are deflected downwards and outwards, and the liquid outlet of the liquid collector is in communication with the tube cavity of the test tube; and wherein the lower opening of the axial passage of the liquid collector is not higher than the lowest point of the lower part of the tube plug, and upon completion of liquid collecting, the residual liquid in the liquid collector is poured out and the liquid collector is separated from the test tube assembly, leaving the test tube assembly to be used by testing devices or testers.

16. The combined structure of claim 1, wherein the outer surface of the lower part of the liquid collector cooperates with the second annular protrusion arranged on the inner wall of the first passage; or the outer surface of the lower part of the liquid collector matches with both the inner wall of the first passage and the second annular protrusion arranged on the inner wall of the first passage; or the first annular recess on the outer surface of the lower part of the liquid collector cooperates with the second annular protrusion arranged on the inner wall of the first passage of the tube plug, and the outer surface of the lower part of the liquid collector abuts on the upper faces of the movable parts, wherein the second annular protrusion is configured for sealing for cooperation with the lower part of the liquid collector and improving the stability of the cooperation.

17. The combined structure of claim 1, wherein the first annular protrusion is arranged on the outer surface of the lower part of the liquid collector and matches with the second annular recess arranged on the inner wall of the first passage, and the outer surface of the lower part of the liquid collector matches with the inner wall of the first passage and abuts on the upper faces of the movable parts.

18. The combined structure of claim 1, wherein an annular protrusion is arranged on the outer wall of the tube plug and configured to cooperate with an annular recess arranged on the inner wall of the test tube.

19. The combined structure of claim 1, wherein the height of the tube plug in the tube cavity of the test tube is no less than 5% and no more than 20% of the height of the tube cavity of the test tube, or no less than 8% and no more than 16% of the height of the tube cavity of the test tube.

* * * * *